United States Patent [19]

Shikama et al.

[11] Patent Number: 4,835,761
[45] Date of Patent: May 30, 1989

[54] SIGNAL TO NOISE RATIO OF OPTICAL HEAD APPARATUS EMPLOYING SEMICONDUCTOR LASER BEAM SOURCE

[75] Inventors: Shinsuke Shikama; Eiichi Toide, both of Kyoto, Japan

[73] Assignee: Mitsubishi Denki Kabushiki Kaisha, Tokyo, Japan

[21] Appl. No.: 928,816

[22] Filed: Nov. 7, 1986

[30] Foreign Application Priority Data

Nov. 20, 1985 [JP] Japan ................................ 60-260356
Nov. 20, 1985 [JP] Japan ................................ 60-260358

[51] Int. Cl.4 .............................................. G11B 7/00
[52] U.S. Cl. .................................. 369/122; 369/110; 369/111
[58] Field of Search ............... 369/109, 116, 121, 122, 369/110, 111, 112; 372/33; 350/162.11, 162.17, 162.2, 311, 162.19

[56] References Cited

U.S. PATENT DOCUMENTS 4,337,535  6/1982  Van Megen et al. ............... 369/121
4,460,990  7/1984  Opheij ................................ 369/112
4,592,038  5/1986  Kubota et al. ................... 369/112 X

FOREIGN PATENT DOCUMENTS 56-137118  10/1981  Japan ............................ 350/162.22
59-71142   4/1984   Japan .
60-257584  12/1985  Japan .................................. 372/33
61-1078    1/1986   Japan .................................. 372/33

OTHER PUBLICATIONS

Mitsubishi Denki-vol. 58, No. 11, 1984-pp. 742-745.
Nikkei Electronics, 1983, 10/10, pp. 185.
English Translation of 59-71142.

*Primary Examiner*—Aristotelis M. Psitos
*Attorney, Agent, or Firm*—Wolf, Greenfield & Sacks

[57] ABSTRACT

In an optical head apparatus for an optical information carrier comprising a semiconductor laser beam source, a condenser lens system and a beam splitter interposed therebetween in an optical system wherein the noise level may be beyond the allowable limit due to the excessive amount of the laser beam which is made incident on the laser beam source after being reflected by the information carrier, the reflected light attenuating means is provided between the optical information carrier and the semiconductor laser beam source, so that the noise level can be set to remain within the allowable limit.

5 Claims, 4 Drawing Sheets

SIGNAL TO NOISE RATIO OF OPTICAL HEAD APPARATUS EMPLOYING SEMICONDUCTOR LASER BEAM SOURCE

FIELD OF THE INVENTION

The present invention relates to an optical head apparatus and more particularly to the improvement of the signal to noise ratio or S/N in an optical head apparatus which utilizes a laser beam for writing/reading information to and from an information recording carrier.

PRIOR ARTS

Such an optical head apparatus is well known for directing a laser beam onto an optical information carrier, for example a disc with pits formed on the surface thereof, and for reading the information recorded on the disc from the reflected light of the laser beam. Such an optical head apparatus is employed in various electrical apparatuses such as audio PCM disc players, video disc players and the like.

The schematic construction of such an optical head apparatus according to a prior art is shown in FIG. 1.

In FIG. 1, numeral 1 designates a semiconductor laser beam source adapted to emit the laser beam and contained in a package 2. Numeral 3 designates a window member through which the laser beam emitted from the semiconductor laser beam source 1 may pass, numeral 4 designates the laser beam flux which has passed through the window member, numeral 5 designates a beam splitter, numeral 6 designates the condenser lens adapted to collect the laser beam flux 4 on an optical disc 7 which serves as the optical information carrier, numeral 8 designates the pits which represent the optical information formed on the optical disc 7, numeral 9 designates a rotary shaft adapted to rotatably drive the optical disc 7 and numeral 10 designates a photo-detector adapted to detect the reflected laser beam which has been divided by the beam splitter 5.

The operation of the conventional apparatus as described above will next be explained.

The laser beam flux 4 emitted from the semiconductor laser beam source 1 is caused to pass through the window member 3 attached to the package 2 and the beam splitter 5 and is condensed by the condenser lens 6 on the pits formed on the optical disc 7. Then, the laser beam flux reflected from the optical disc 7 is directed again through the condenser lens 6 to the beam splitter 5 which changes the direction of the laser beam flux so that it is then made incident on the photo-detector 10.

The photo-detector 10 serves to detect the intensity of the reflected laser beam the intensity of which has been modulated by the pits on the optical disc 7 to thereby detect the presence of the pits 8 at the relevant position on the rotating disc 7 for condensing the laser beam flux in respect of the lapse of time, so that the information contained on the optical disc 7 can be read out.

On the other hand, optical head apparatus have also been widely used as recording/reproducing heads for optical disc apparatus, in which, for example, the semiconductor laser emitted from a light source is illuminated onto the information recording area on an optical disc by use of a condenser lens system so as to write or read out information to or from the optical disc.

In FIG. 2 is shown the general or conventional constitution of such an optical head apparatus wherein the laser beam 4 emitted from the light source or the laser diode 1 passes through a diffraction grating 20 so that it will be diffracted into a main beam flux for writing/reading of the information and a pair of auxiliary beam fluxes to be used as tracking sensors, namely three beam fluxes in total. In this way, these beam fluxes are respectively condensed on the pits 8 on the optical disc 7 as the information recording carrier by the condenser lens system 6 after having been transmitted through the beam splitter 5. At this point, the laser beam 4 condensed on the optical disc 7 is divided into three condensed light spots 200a, 200b and 200c corresponding to the three beam fluxes divided by the diffraction grating.

In the block at the right side of FIG. 2, drawn on an enlarged scale, are shown the laser beam positions illuminated on the optical disc in which the line connecting the three condensed light spots or positions 200a, 200b and 200c is slanted with respect to the line of the track 30 comprised of the row of pits formed on the optical disc 7. The central condensed light spot 200b is to be used for writing/reading the signals while the spots 200a and 200c at the opposite sides are used as the tracking sensors for the track 30.

In operation, the laser beam 4 reflected by the optical disc 7 is made incident on the beam splitter 5 through the condenser lens system 6. It is to be noted here that a part of the reflected laser beam 4 is reflected by the beam splitter 5 to the photo-detector 10 while the rest of the reflected laser beam is again made directly incident on the laser diode 1 through the beam splitter 5.

At the lower right portion of FIG. 2, drawn on an enlarged scale, is shown the reflected laser light 4 which has been directed on the photo-detector 10. This reflected light 4 is made incident on the photo-detector 10 in the form of three condensed light spots 300a, 300b and 300c corresponding to the three condensed light spots 200a, 200b and 200c, respectively.

The photo-detector 10 has three light receiving parts 40a, 40b and 40c respectively adapted to receive the respective condensed light spots 300a, 300b and 300c. As is well known, the central light receiving part 300b is adapted to read the information written in the optical disc 7 while the upper and lower light receiving parts 300a, 300c are adapted to detect the displacement of the illuminated position of the laser beam 4 from the center of the track 30 of the optical disc 7.

Now, it is to be noted that the semiconductor laser beam source or the laser diode 1 to be employed in the optical head apparatus shown in FIGS. 1 and 2 have in many cases been of the construction referred to as the refractive index guide type. This is because, since in the optical head apparatus of this type, the light beam condensing optical system from the semiconductor laser beam source 1 to the optical disc 7 must be operated in a condition of having substantially no aberration, the semiconductor laser beam source of the refractive index guide type has smaller astigmatism compared to that of other types or the semiconductor laser beam source of the gain guide type, and is suitable for better light beam condensing.

However, the semiconductor laser beam source of the refractive index guide type has higher coherency compared to the semiconductor laser beam source of the gain guide type and has caused such problems as noise being induced by the light reflected from the optical disc when it returns to the emitting end face for the laser beam of the semiconductor laser beam source after having passed through the beam splitter.

In other words, although the laser beam 4 reflected from the optical disc 7 is caused to be directed through the condenser lens 6 to the photo-detector 10 by means of the beam splitter 5, a part of the reflected laser beam passes through the beam splitter 5 (and the diffraction grating 20 in FIG. 2) to the laser beam emitting end face of the semiconductor laser beam source 1. Even if the percentage of the reflected laser beam which may return to the laser beam source 1 is very small namely on the order of 0.1%, this is enough to degrade the S/N ratio of the laser beam emitted from the semiconductor laser beam source 1 and has been the cause of a conspicuous problem with respect to reading information from the optical information carrier or the disc 7.

In view of this fact, the applicant of the present invention has proposed the so-called "light feed-back method". This light feed-back method is described in detail in "MITSUBISHI DENKI GIHO, Vol. 58, xlo. 11, 1984" and Japanese Patent Application No. 71142/1984 and is intended to reduce the noise by positively feeding back more than a few percent of the laser beam reflected from the optical disc to the laser beam emitting end face of the semiconductor laser beam source. Namely, this method makes better use of the characteristic of the noise induced by the laser beam returning to the semiconductor laser beam source, the noise level being degraded once at around the 0.1% level as the value of returning light increases, starting from 0%, and then becoming better again after more than 0.1% has been attained, as shown in FIG. 3. However, closer investigation of the noise characteristic induced by the laser beam returning to the semiconductor laser beam source has revealed that all the semiconductor laser beams do not necessarily exhibit good S/N ratio characteristics in accordance with this increase in the laser beams returning to the source, and there are certain semiconductor laser beam sources which have caused the noise level to be increased again in a range (for example, point B in FIG. 3) having a larger amount of returning laser beams and an S/N ratio exceeding the allowable limit.

It is of course possible to attain a required S/N ratio even with regard to such semiconductor laser beam sources if they are to be used in the range of returning laser beam, for example, as shown by point A in FIG. 3. In actuality, however, the percentage of the laser beams which returns to the laser beam source will fluctuate on the order of two to three times due to fluctuation of the spreading angle of the emitted light flux in the optical head apparatus, fluctuation of transmission through the optical members and so forth. It is therefore extremely difficult to accurately set the value of the returning light at a point near the point A where the noise level is low.

SUMMARY OF THE INVENTION

The present invention has been proposed with a view to solving the disadvantages or problems described above.

It is an object of the present invention, therefore, to provide an improved optical head apparatus in which the noise induced by the laser beam returning to a semiconductor laser beam source can be reduced even if a source having a noise characteristic as shown in FIG. 3 is applied to the apparatus.

Another object of the present invention is to provide an optical head apparatus for reading out the information recorded on an optical information carrier comprising a semiconductor laser beam source of a refractive index guide type for emitting a laser beam; a condenser lens system for condensing the laser beam flux emitted from the semiconductor laser beam source onto the optical information carrier; and a beam splitter interposed between the semiconductor laser beam source and the condenser lens system for dividing the laser beam reflected from the optical information carrier, the optical head apparatus being characterized by a means for attenuating the laser beam, which is disposed in an optical path between the optical information carrier and the semiconductor laser beam source, so that the amount of the reflected laser beam which is made incident on the semiconductor laser beam source can be reduced.

Another object of the present invention is to provide an optical head apparatus for writing/reading information to and from an optical information carrier in which the information can be optically stored comprising a semiconductor laser beam source for emitting a laser beam to write/read the information to and from the optical information carrier; a condenser lens system for condensing the laser beam flux emitted from the semiconductor laser beam source onto the optical information carrier; a beam splitter interposed between the semiconductor laser beam source and the condenser lens system for dividing the laser beam reflected from the optical information carrier; and diffraction grating means for diffracting the laser beam emitted from the semiconductor laser beam source so that the laser beam flux condensed onto the optical information carrier by the condenser lens system can be imaged as a condensed light spot for writing/reading the information and a plurality of condensed light spots for sensing a track, the diffraction grating means being disposed in an optical path between the semiconductor laser beam source and the condenser lens system, the optical head apparatus being characterized in that the diffraction grating means includes a reflected light attenuating means for attenuating the amount of the laser beam which is made incident on the semiconductor laser beam source through the condenser lens system after being reflected from the optical information carrier.

According to the present invention, the reflected light attenuating means is provided between the optical information carrier and the semiconductor laser beam source in an optical system wherein the noise level may be beyond the allowable limit due to an excessive amount of the reflected laser beam being made incident on the emitting end face of the semiconductor laser beam source, and it is possible, therefore to attenuate the amount of the reflected laser beam so that the noise level can be set to remain within the allowable limit.

According to the present invention, the reflected light attenuating means is provided with the diffraction grating means which is disposed between the semiconductor laser beam source and the condenser lens system. Therefore, it is possible to attenuate the amount of the reflected laser beam which may be made incident on the semiconductor laser beam source, to thereby bring the noise level down substantially below the allowable limit. As a result, it is possible to improve the S/N ratio of the laser beam emitted from the semiconductor laser beam source, so that the information can be accurately written into and read-out from the optical information carrier such as an optical disc or the like.

These and other objects and advantages of the present invention will appear more clearly from the following detailed disclosure read in conjunction with the accompanying drawings.

PREFERRED EMBODIMENT OF THE INVENTION

The preferred embodiments of the present invention will now be explained with reference to the accompanying drawings.

Figure 1:
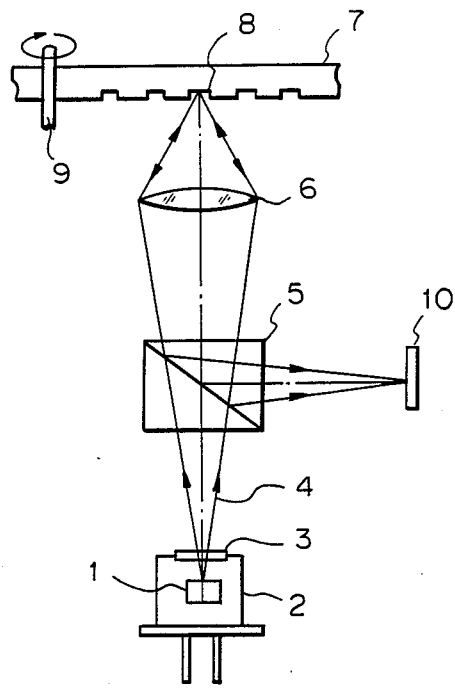
FIG. 1 shows a schematic representation of the constitution of a conventional optical head apparatus for reading out the information on an optical information carrier.
Figure 4:
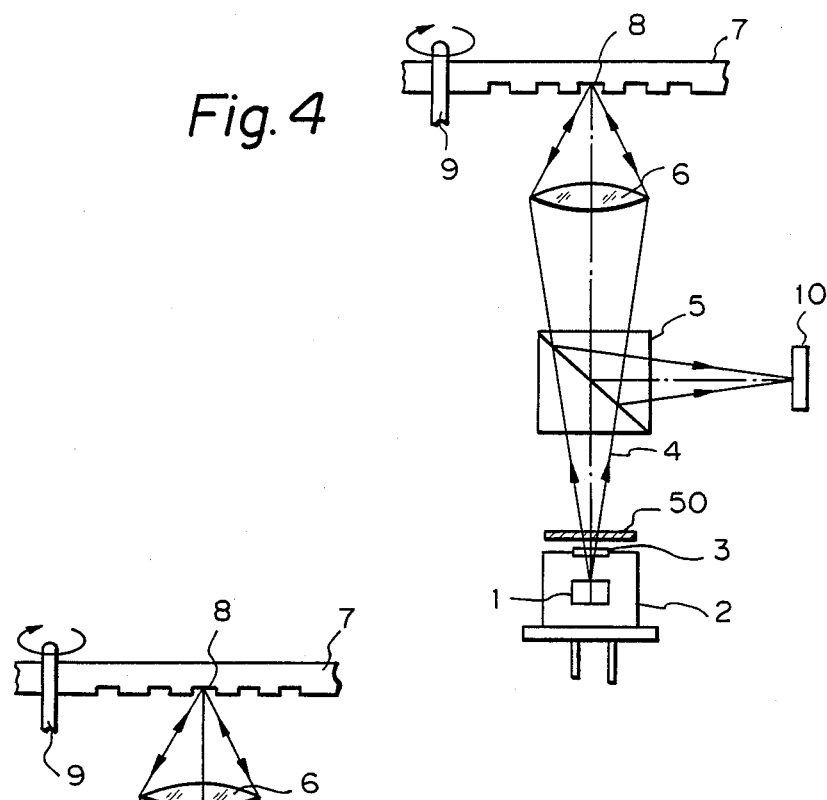
FIG. 4 shows a schematic representation of the constitution of an optical head apparatus according to the first embodiment of the present invention.

In FIG. 4 is schematically shown the constitution of the optical head apparatus according to the first embodiment of the present invention. The components or elements equivalent to those shown in FIG. 1 are designated by the same numerals and explanation thereof will not be repeated.

The present embodiment is characterized in that a light attenuating means 50 for attenuating the amount of the laser beam is provided between the semiconductor laser beam source 1 and the beam splitter 5.

The operation of the present embodiment will next be explained.

Figure 3:
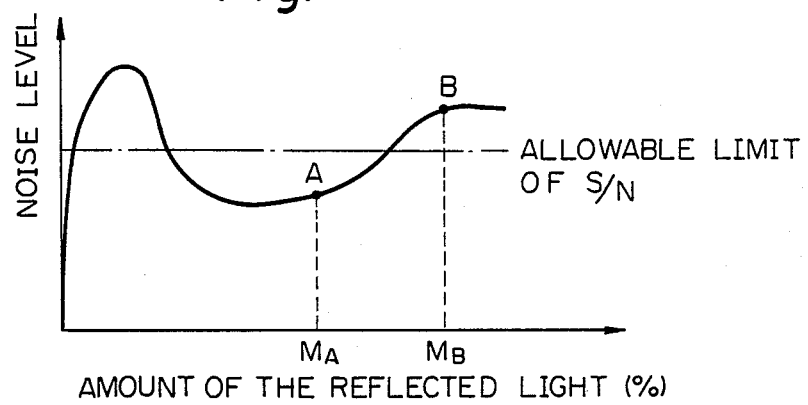
FIG. 3 is a characteristic diagram showing the relationship between the amount of the reflected light returning to the semiconductor laser beam source and the noise level in the optical head apparatus shown in FIGS. 1 and 2.

It is to be noted that the amount of the reflected laser beam in the conventional optical head apparatus which has caused the noise level to exceed the allowable limit due to the excessive amount of the reflected laser beam is designated as $M_B$ (refer to FIG. 3).

It is also to be noted that the rate of the reflected laser beam returning to the semiconductor laser beam source will be reduced to $M_B T^2$ and hence less than $M_B$ by interposing the light attenuating means 50 having a light transmissivity of T (provided $0 < T < 1$) between the semiconductor laser beam source 1 and the beam splitter 5, as implemented in the present embodiment, because the laser beam flux is transmitted through the light attenuating means 50 forwardly and backwardly.

Since the value T may be optionally selected as a value between 0 and 1 it is possible to set the amount of the reflected laser beam at a point (such as the point designated by $M_A$ in FIG. 3) where the noise level is acceptable in the case of an optical head apparatus in which the noise characteristic is degraded due to the excessive amount of the reflected laser beam returning to the laser beam source 1 even if the amount of the reflected laser beam fluctuates.

Test results have revealed that in the cases of ten optical head apparatuses each of which has 8% of the rate of the reflected laser beam returning to the laser beam source 1 prior to the light attenuating means 50 being interposed and also has the reproduced signal in an unfavourable condition due to the noise characteristic of the semiconductor laser beam source 1, when a "WRATTEN GEL ND FILTER" produced by Eastman Kodak Company, in Rochester, N.Y., has been interposed between the semiconductor laser beam source 1 and the beam splitter 5 as the light attenuating means 50, the overall reproducing characteristics of the optical head apparatus have become favourable and the noise characteristics have been favourably improved due to the reduction of the rate of the reflected laser beam returning to the semiconductor laser beam source 1.

It is to be noted here that the type of light attenuating means which may be employed is not limited to the one above cited and other types of filters may be used as well, such as interference filters, glass ND filters, color filters and the like. In other words, any type of filter may be used as the light attenuating means for reducing the noise so long as it capable of attenuating the amount of the reflected laser beam returning to the source.

Although an example of the light attenuating means 50 being disposed between the window member 3 and the beam splitter 5 has been explained with reference to FIG. 4, such a light attenuating means may alternatively be disposed between the beam splitter 5 and the condenser lens system 6, between the condenser lens 6 and the optical disc 7 or between the semiconductor laser beam source 1 and the window member 3. It is important to note that the reflected laser beam returning to the semiconductor laser beam source 1 may be suitably controlled if the light attenuating means 50 is disposed at any position between the semiconductor laser beam source 1 and the optical information carrier or the optical disc 7.

It is therefore possible to dispose the light value attenuating means 50 at the time of assembly of the optical head apparatus or after adjustment thereof without affecting the optical path. It is also possible for the present invention to be applied where it is necessary to salvage the optical head apparatus where the noise level is caused to increase due to the excessive amount of the reflected laser beam returning to the semiconductor laser beam source 1 in respect of the noise induced by such returning laser beam.

Further, in addition to the disposition of the light attenuating means 50, it is conceivable to vary the light transmissivity of the beam splitter 5 as a means of reducing the rate of the reflected laser beam returning to the source. In fact, however, this solution necessitates positional adjustment of the photo-detector 10 by exchanging the beam splitter 5, thus making it a salvage method which requires much time and expense.

Figure 5:
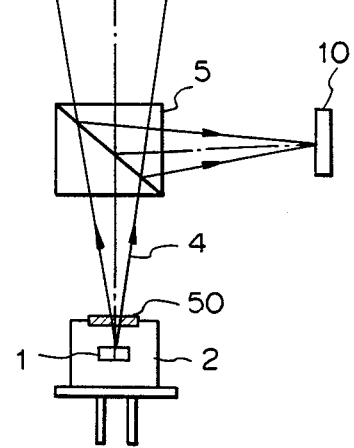
FIG. 5 shows a schematic representation of the constitution of an optical head apparatus according to the second embodiment of the present invention.

The second embodiment of the present invention will now be explained with reference to FIG. 5.

In this embodiment, the window member which has been provided in the package 2 according to a prior art is now formed by the light attenuating means 50.

With this embodiment, therefore, the noise level can be reduced by limiting the amount of the laser beam returning to the source, as in the first embodiment explained above, and also the window member 3 can be eliminated, thus providing the possibility of cost reduction.

Furthermore, the present embodiment necessitates no extra space for inserting the light attenuating means 50 whereby it can, in particular, be suitably applied to a small optical head.

It is further to be noted that the respective embodiments have been described in respect of an optical head apparatus for application to an optical disc of the type such as a compact disc wherein information is stored in pits formed on the optical information carrier. It is in fact possible for the embodiments to be applied to optical information carriers of other types, for example those of the magneto-optical type or phase change type.

The third through fifth preferred embodiments of the present invention will now be explained with reference to FIGS. 6 to 8. It is to be understood that the components which correspond to those shown in FIG. 2 are given the same reference numerals and separate explanation of them will be omitted.

Figure 2:
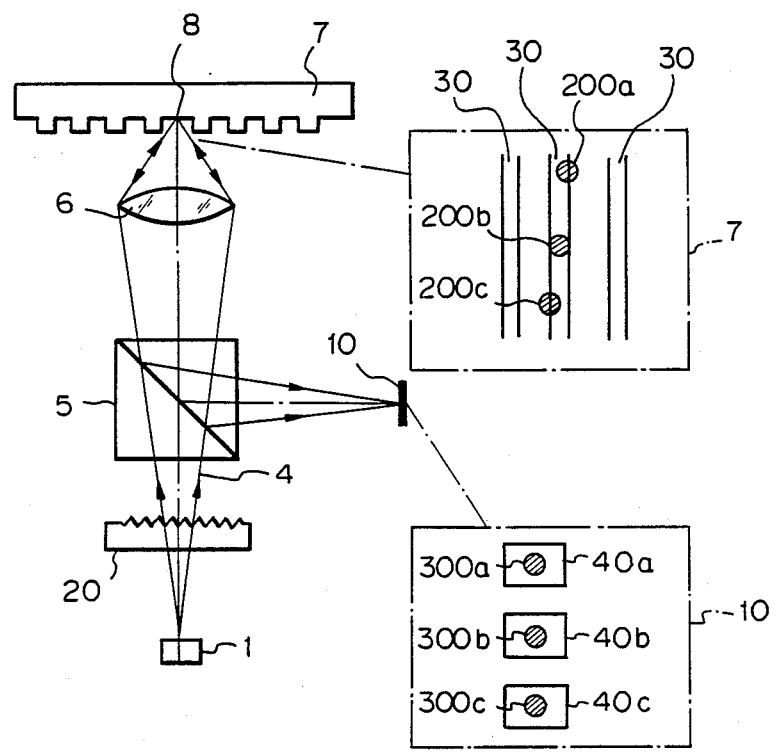
FIG. 2 shows a schematic representation of the constitution of a conventional optical head apparatus for writing/reading information to and from an optical information carrier.

With respect to those the optical head apparatus in these embodiments is constituted to in a similar manner to that of the prior art shown in FIG. 2 and is characterized in that the diffraction grating member 20 is provided with a means 50' for attenuating the reflected light, which is adapted to attenuate the reflected light returning to the semiconductor laser beam source or the laser diode 1 through the condenser lens system 6.

Figure 6:
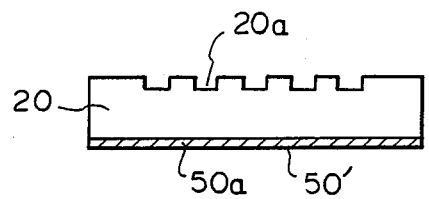
FIG. 6 shows a schematic representation of the constitution of an optical head apparatus, in particular the diffraction grating member including the light attenuating means, according to the third embodiment of the present invention.

One preferred embodiment of such a reflected light attenuating means 50' is shown in FIG. 6.

In general, the diffraction grating member 20 is formed with a diffraction grating part 20a at the side of the condenser lens system 6 in FIG. 2. In this embodiment, the reflected light attenuating means 50' comprises a light attenuating thin film 50a formed by a vapor depositing method on the surface of the diffraction grating member 20 at the side of the laser diode 1 in FIG. 2.

The thin film 50a may be formed by use of a metallic vapor deposition film such as aluminum, a dielectric vapor deposition film or the like.

Figure 7:
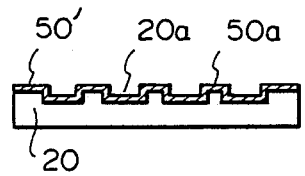
FIG. 7 shows a schematic representation of the constitution of an optical head apparatus, in particular the diffraction grating member including the light attenuating means, according to the fourth embodiment of the present invention.

In FIG. 7 is illustrated another embodiment of the reflected light attenuating means 50'. In this embodiment, the film 50a is formed at the side of the condenser lens system 6.

Figure 8:
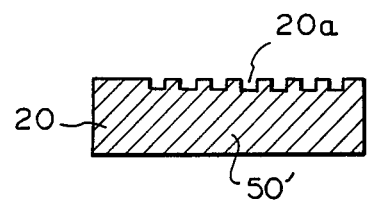
FIG. 8 shows a schematic representation of the constitution of an optical head apparatus, in particular the diffraction grating member including the light attenuating means, according to the fifth embodiment of the present invention.

In FIG. 8 is illustrated a further embodiment of the reflected light attenuating means 50'. This reflected light attenuating means is provided in such a way that the diffraction grating member 20 is in itself formed of a bulk material having light attenuating characteristics, for which an ND filter colored glass material or the like may be employed.

In other words, any reflected light attenuating means 50' may be employed according to the present invention so long as it is capable of attenuating the reflected light which may return to the laser diode 1. Needless to say other forms of construction than those cited herein may be employed as required.

With respect to the light attenuating means shown in FIGS. 6 to 8, the operation will next be explained with reference to FIGS. 2 and 3.

In the present embodiments, assuming that the light transmissivity of the reflected light attenuating means 50' is T (provided 0<T<1), and the amount of the reflected light returning to the laser diode through the condenser lens system 6 and the beam splitter 5 is at $M_B$ which is above the allowable limit of the noise level as shown at the point B of FIG. 3, it can be deduced that the amount M of the reflected light returning to the laser diode 1 through the reflected light attenuating means 50' will be $M_B T^2$ which is smaller than $M_B$.

It is to be noted here that the amount of the reflected light, $M_B$, is multiplied by $T^2$ because the laser beam 4 emitted from the laser diode 1 passes through the reflected light attenuating means 50' twice, that is, forwardly and backwardly.

Accordingly, by selecting the light transmissivity of the reflected light attenuating means 50' at a value in the range between 0 and 1, the present invention makes it possible to considerably reduce the amount of the reflected light, M, and to keep it constantly at the point A, for example, which is below the allowable limit for the S/N ratio even in a case where the value M is too big for the S/N ratio to considerably exceed the allowable limit.

The applicant of the present invention executed an experiment in order to further ascertain the effect of the present invention wherein a dielectric interference filter having a light transmissivity T=0.6 was formed on the surface of the diffraction grating member 20 as shown in FIG. 7.

When no interference filter was provided, the amount of the reflected light, M, was about 8%. It was found, however, that the value M was reduced to about 2% on providing the interference filter, the noise characteristic of the laser diode 1 being greatly improved also, and the reproduction quality of the signals relative to the optical disc 7 being greatly enhanced.

It should be pointed out that the method of controlling the amount of the reflected light, M, is also made theoretically feasible by controlling the light transmissivity of the beam splitter 5. However from the practical point of view, if the beam splitter 5 is in itself made adjustable in respect of its light transmissivity, the positional adjustment of the photo-detector 10 and other adjustments become cumbersome, and thus it is not acceptable for utilization in practice.

According to the present invention, however, it is possible to freely adjust the amount M of the reflected light returning to the laser diode 1 simply by exchanging the diffraction grating member 20. It can be understood that compared to the method of exchanging the beam splitter 5 itself, it is much simpler to handle adjustment of the value M with the present invention.

According to the present invention, therefore, if a plurality of diffraction grating members 20 provided with the reflected light attenuating means having different light transmissivity T are prepared, it will be possible to easily set the amount M of the reflected light returning to the laser diode 1 at the optimum value simply by exchanging the diffraction grating member 20 and this can be done even after the optical head apparatus has been assembled.

Namely, when the amount M of the reflected light returning to the laser diode 1 is so big that the noise of the laser diode 1 increases, the noise level of the laser diode 1 can be reduced easily by replacing the diffraction grating member 20 with one having a lower light transmissivity T.

Although an optical head apparatus adapted to write/read information to and from an optical disc on which data is recorded as pit information, such as a compact disc, has been explained as an example of the present embodiment for reasons of clarity, it is a matter of course that the present invention is not limited to such an optical head apparatus and that it can also be applied to optical head apparatus for optical discs of other types, such as those of the magneto-optical type, phase-change type or the like.

We claim:

1. An optical head apparatus for reading out the information recorded on an optical information carrier comprising:
   a semiconductor laser beam source for emitting a laser beam; said semiconductor laser beam source having an undulating noise characteristic given to be as follows:
   (i) as the amount of returning light reflected from said optical information carrier and incident on the laser beam emitting end face of said semiconductor laser beam source increases from zero, the noise level correspondingly increases and then exceeds an allowable limit of S/N ratio,
   (ii) as the amount of returning light increases further, the corresponding noise level becomes saturated at a peak value and then decreases to go below said allowable limit of S/N,
   (iii) as the amount of returning light increases still further, the corresponding noise level becomes inversely saturated to indicate a bottom value at a value of $M_A$ and
   (iv) as the amount of returning light increases even further, the corresponding noise level increases and again exceeds said allowable limit of S/N at a value of $M_B$;
   a condenser lens system for condensing the laser beam flux emitted from said semiconductor laser beam source onto said optical information carrier;
   a beam splitter interposed between said semiconductor laser beam source and said condenser lens system for dividing the laser beam reflected from said optical information carrier; and
   means for attenuating the laser beam disposed in an optical path between said optical information carrier and said semiconductor laser beam source and being selected to have sufficient light transmissivity to ensure that the amount of returning light is in a range defined as follows:
   (i) the returning light is greater than the amount of light having a corresponding noise level at said peak value;
   (ii) the returning light is less than the amount of light having a corresponding noise level at said value $M_B$;
   (iii) the returning light further has a corresponding noise level which is below said allowable limit of S/N.

2. An optical head apparatus as set forth in claim 1 characterized in that said attenuating means comprises a window member in a package for protecting said semiconductor laser beam source.

3. An optical head apparatus for writing/reading information to and from an optical information carrier in which the information can be optically stored comprising;
   a semiconductor laser beam source for emitting a laser beam to write/read the information to and from said optical information carrier; said semiconductor laser beam source having an undulating noise characteristic given to be as follows:
   (i) as the amount of returning light reflected from said optical information carrier and incident on the laser beam emitting end face of said semiconductor laser beam source increases from zero, the noise level correspondingly increases and then exceeds an allowable list of S/N ratio,
   (ii) as the amount of returning light increases further, the noise level becomes saturated at a peak value and then decreases to go below said allowable limit of S/N,
   (iii) as the amount of returning light increases still further, the corresponding noise level becomes inversely saturated to indicate a bottom value at a value of $M_A$; and
   (iv) as the amount of returning light increases even further, the corresponding noise level increases and again exceeds said allowable limit of S/N at a value of $M_B$;
   a condenser lens system for condensing the laser beam flux emitted from said semiconductor laser beam source onto said optical information carrier;
   a beam splitter interposed between said semiconductor laser beam source and said condenser lens system for dividing the laser beam reflected from said optical information carrier;
   diffraction grating means for diffracting the laser beam emitted from said semiconductor laser beam source so that the laser beam flux condensed onto said optical information carrier by said condenser lens system can be imaged as a condensed light spot for writing/reading the information and a plurality of condensed light spots for sensing a track, said diffraction grating means being disposed in an optical path between said semiconductor laser beam source and said beam splitter; and
   means for attenuating the laser beams, said means being disposed in an optical path between said optical information carrier and said semiconductor laser beam source and being selected to have sufficient light transmissivity to ensure that the amount of returning light is in a range defined as follows:
   (i) the returning light is greater than the amount of light having a corresponding noise level at said peak value;
   (ii) the returning light is less than the amount of light having a corresponding noise level at said value $M_B$;
   (iii) the returning light further has a corresponding noise level which is below said allowable limit of S/N.

4. An optical head apparatus as set forth in claim 3 characterized in that said attenuating means is formed by use of a thin film for attenuating the amount of the laser beam, which is provided on the surface of said diffraction grating means either at the side of said semiconductor laser beam source or at the side of said condenser lens system.

5. An optical head apparatus as set forth in claim 3 characterized in that said reflected light attenuating means is formed in such a way that said diffraction grating means is in itself formed by use of a bulk material having a characteristic of attenuating the amount of the laser beam.

* * * * *